(12) United States Patent
Jain et al.

(10) Patent No.: US 8,839,399 B2
(45) Date of Patent: Sep. 16, 2014

(54) TENANT DRIVEN SECURITY IN A STORAGE CLOUD (75) Inventors: Bhushan P. Jain, Jalgaon (IN); Sandeep R. Patil, Elmsford, NY (US); Sri Ramanathan, Lutz, FL (US); Gandhi Sivakumar, Victoria (AU); Matthew B. Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 124 days.

(21) Appl. No.: 13/435,874

(22) Filed: Mar. 30, 2012

(65) Prior Publication Data
US 2013/0263242 A1 Oct. 3, 2013

(51) Int. Cl.
G06F 13/00 (2006.01)
G06F 13/28 (2006.01)
G06F 17/30 (2006.01)
G06F 21/00 (2013.01)
G06F 12/14 (2006.01)
G06F 21/34 (2013.01)
G06F 21/77 (2013.01)
G06F 21/78 (2013.01)
H04L 29/06 (2006.01)

(52) U.S. Cl.
CPC ............ G06F 12/1408 (2013.01); G06F 21/34 (2013.01); G06F 21/77 (2013.01); G06F 21/78 (2013.01); H04L 63/0853 (2013.01); H04L 63/10 (2013.01)
USPC ................ 726/9; 711/147; 711/164; 713/185

(58) Field of Classification Search
None
See application file for complete search history.

(56) References Cited

U.S. PATENT DOCUMENTS

| | | | |
|---|---|---|---|
| 6,243,813 B1 | 6/2001 | Kong | |
| 6,614,750 B2 | 9/2003 | Weber et al. | |
| 7,613,921 B2 | 11/2009 | Scaralata | |
| 2003/0105972 A1 | 6/2003 | Teng | |
| 2007/0101152 A1* | 5/2007 | Mercredi et al. | 713/185 |
| 2008/0080718 A1 | 4/2008 | Meijer et al. | |
| 2008/0083036 A1 | 4/2008 | Ozzie et al. | |
| 2010/0235630 A1 | 9/2010 | Carter et al. | |
| 2011/0022642 A1 | 1/2011 | deMilo et al. | |
| 2011/0047381 A1 | 2/2011 | Ganesan et al. | |
| 2011/0107398 A1 | 5/2011 | Earl et al. | |
| 2011/0131275 A1 | 6/2011 | Maida-Smith et al. | |
| 2012/0066773 A1* | 3/2012 | Weisberger | 726/29 |

* cited by examiner

*Primary Examiner* — Fatoumata Traore
(74) *Attorney, Agent, or Firm* — Matthew Chung; Roberts Mlotkowski Safran & Cole, P.C.

(57) ABSTRACT

Tenant driven security in a storage cloud is provided. A method includes determining whether a tenant places a physical key into a slot associated with a hard disk provided by a service provider. The method further includes allowing the tenant to have access to the hard disk after determining that the tenant has placed the physical key into the slot.

22 Claims, 5 Drawing Sheets

TENANT DRIVEN SECURITY IN A STORAGE CLOUD

FIELD OF THE INVENTION

The present invention generally relates to cloud computing, and more particularly, to tenant drive security in a storage cloud.

BACKGROUND

Information technology is changing rapidly and now forms an invisible layer that increasingly touches nearly every aspect of business and social life. An emerging computer model known as cloud computing addresses the explosive growth of Internet-connected devices, and complements the increasing presence of technology in today's world. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

Cloud computing is massively scalable, provides a superior user experience, and is characterized by new, Internet-driven economics. In one perspective, cloud computing involves storage and execution of business data inside a cloud which is a mesh of inter-connected data centers, computing units and storage systems spread across geographies. For example, the emerging cloud paradigm has the key concepts of automation, virtualization, consolidation, etc. for offering software as a service (SaaS) and/or infrastructure (e.g., data storage) as a service (IaaS). When offering software as a service, the service can be consumed by multiple consumers. Similarly, when offering infrastructure as a service, the infrastructure may be shared by multiple clients.

While clients may be inclined towards purchasing such cloud services for cost savings and convenience, the main hindrance can be their lack of trust in service providers to protect and ensure data security from other clients who share the cloud services. Service providers may provide a spectrum of security mechanisms, such as, for example, user identifier (ID) and password-based authentication and/or token exchange-based mechanisms, which provide limited or no control to the tenants. However, even with this security architecture in place, clients may still not have complete trust in the security of their data.

SUMMARY

In a first aspect of the invention, a method comprises determining whether a tenant places a physical key into a slot associated with a hard disk provided by a service provider. The method further comprises allowing the tenant to have access to the hard disk after determining that the tenant has placed the physical key into the slot.

In another aspect of the invention, a system implemented in hardware comprises a computer infrastructure operable to: deny a tenant access to a hard disk provided by a service provider before sensing that the tenant has placed a physical key into a slot associated with the hard disk; sense that the tenant has placed the physical key into the slot; and allow the tenant to have access to the hard disk after the physical key has been sensed in the slot.

In an additional aspect of the invention, a computer program product comprises a tangible computer usable storage medium having readable program code embodied in the tangible computer usable storage medium. The computer program product includes at least one component operable to: determine that a tenant has placed a physical key into a slot associated with a hard disk serviced by a service provider; and allow the tenant access to the hard disk after determining that the tenant has placed the physical key into the slot.

In a further aspect of the invention, a method of tenant drive security comprises providing a computer infrastructure operable to: provide a tenant using a service with access to a hard disk, a personalized physical key, and a key hook substrate associated with the hard disk; generate a unique key once the physical key is placed into a slot of the key hook substrate; deny, by default, access to the hard disk until the physical key is placed into the slot; send the unique key to a hard disk controller; and set a flag to complied in relevant sectors of the hard disk to allow access to the hard disk.

In another aspect of the invention, a computer system for tenant drive security in a storage cloud, includes a CPU, a computer readable memory and a tangible computer readable storage media. First program instructions provide a tenant using a service with access to a hard disk, a personalized physical key, and a key hook substrate associated with the hard disk. Second program instructions generate a unique key once the physical key is placed into a slot of the key hook substrate. Third program instructions deny, by default, access to the hard disk until the physical key is placed into the slot. Fourth program instructions to send the unique key to a hard disk controller. The computer system further comprises fifth program instructions to set a flag to complied in relevant sectors of the hard disk to allow access. The flag is initially set to non-complied to indicate that access to the hard disk is not allowed. The first, second, third, fourth, and fifth program instructions are stored on the tangible computer readable storage media for execution by the CPU via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

The present invention generally relates to cloud computing, and more particularly, to tenant drive security in a storage cloud. In embodiments, the present invention includes an intelligent tenant drive security steward (ITDSS) system which provides control to one or more tenants or clients (e.g., companies) of one or more cloud services for participating in data security. The ITDSS system can include a hard (e.g., physical) key allotted to each tenant and a key hook substrate (KHS) with a slot fitted for the corresponding hard key. The ITDSS system may further include a hard key controller or a "core ITDSS" within the KHS which works with a hard disk controller of at least one hard disk provided by the cloud services.

In implementation, to ensure data security in the cloud services, whenever the tenant and/or other tenants (e.g., via software, such as a class loader) attempt to access data in the hard disk, the hard disk controller, by default, denies access until the tenant places the respective hard key into the slot. Once this occurs, the KHS and/or the hard key controller will generate a unique soft (e.g., software) key. In embodiments, based on the generated soft key, the hard disk controller allows only the tenant with the identified hard key to have access to the data, and/or set the data to a compliant mode so that the cloud services can know about the tenant being allowed access to the data. Advantageously, by allowing tenants to participate in data security in this fashion, the present invention ensures that a compliant and trustful relationship is maintained between the tenants and a cloud service provider with respect to transferred and stored data.

Cloud Computing

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
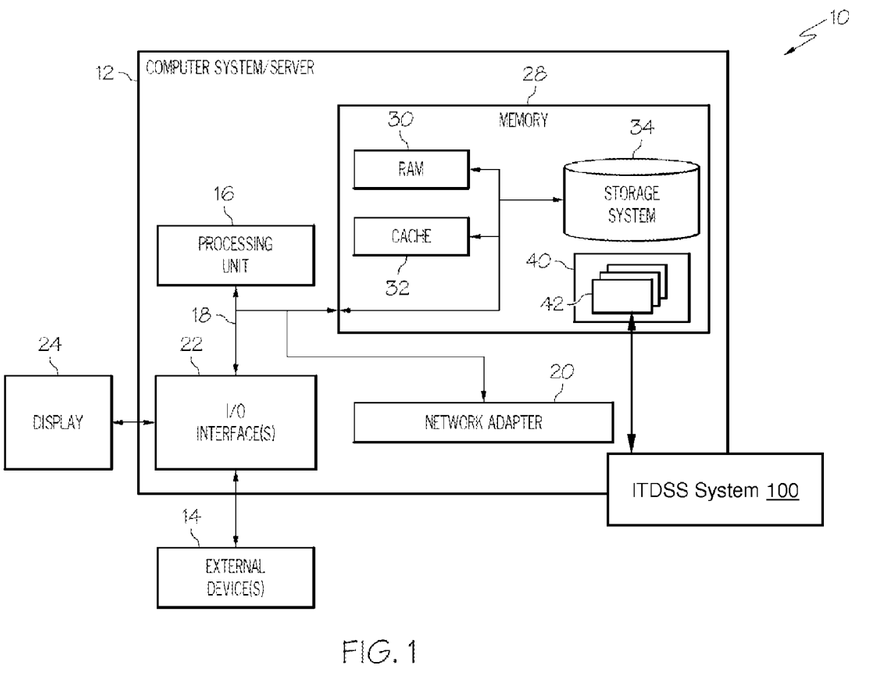
FIG. 1 depicts a cloud computing node in accordance with aspects of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth herein.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16. In embodiments, the computer system/server 12 comprises or communicates with an intelligent tenant drive security steward (ITDSS) system 100 which provides control to one or more tenants or clients (e.g., companies) of one or more cloud services for participating in data security, thus earning the tenants' trust in the cloud service provider. In embodiments, the ITDSS system 100 can include a hard (e.g., physical) key allotted to each tenant and a key hook substrate (KHS) with a slot fitted for the corresponding hard key. The ITDSS system 100 may further include a hard key controller within the KHS, which works with a hard disk controller of at least one hard disk provided by the cloud services.

In implementation, to ensure data security in the cloud services, whenever the tenant and/or other tenants (e.g., via software, such as a class loader) attempt to access data in the hard disk, the hard disk controller, by default, denies access until the tenant places the respective hard key into the slot. Once this occurs, the ITDSS system 100 (e.g., the KHS and/or the hard key controller) generates a unique soft (e.g., software) key. In embodiments, based on the generated soft key, the hard disk controller will allow only the tenant to have access to the data, and/or set the data to a compliant mode so that the cloud services can know about the tenant being allowed access to the data. Advantageously, by allowing tenants to participate in data security in this fashion, at a lower layer in the cloud computing paradigm, the ITDSS system 100 ensures that a compliant and trustful relationship is maintained between the tenants and a cloud service provider with respect to transferred and stored data.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein, e.g., provide control, function, and operability of the ITDSS system 100. For example, the ITDSS system 100 can lock data access from one or more tenants or clients of one or more cloud services based on a physical condition, e.g., whether a tenant's hard key is inserted into a slot of a respective hard disk where the data is stored. Advantageously, by including this client-driven security at a sector level (e.g., a level of the hard disk), the ITDSS system 100 may be used in the cloud computing node 10 to ensure the trust between the tenants and the cloud services with respect to data security.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
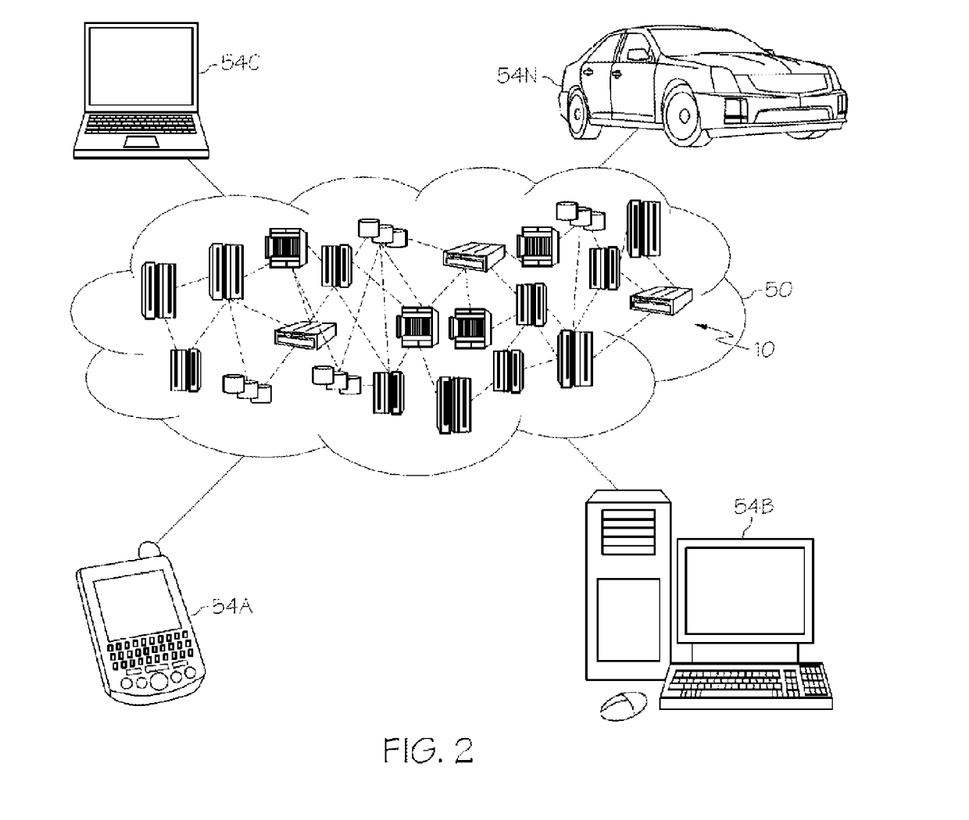
FIG. 2 depicts a cloud computing environment in accordance with aspects of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
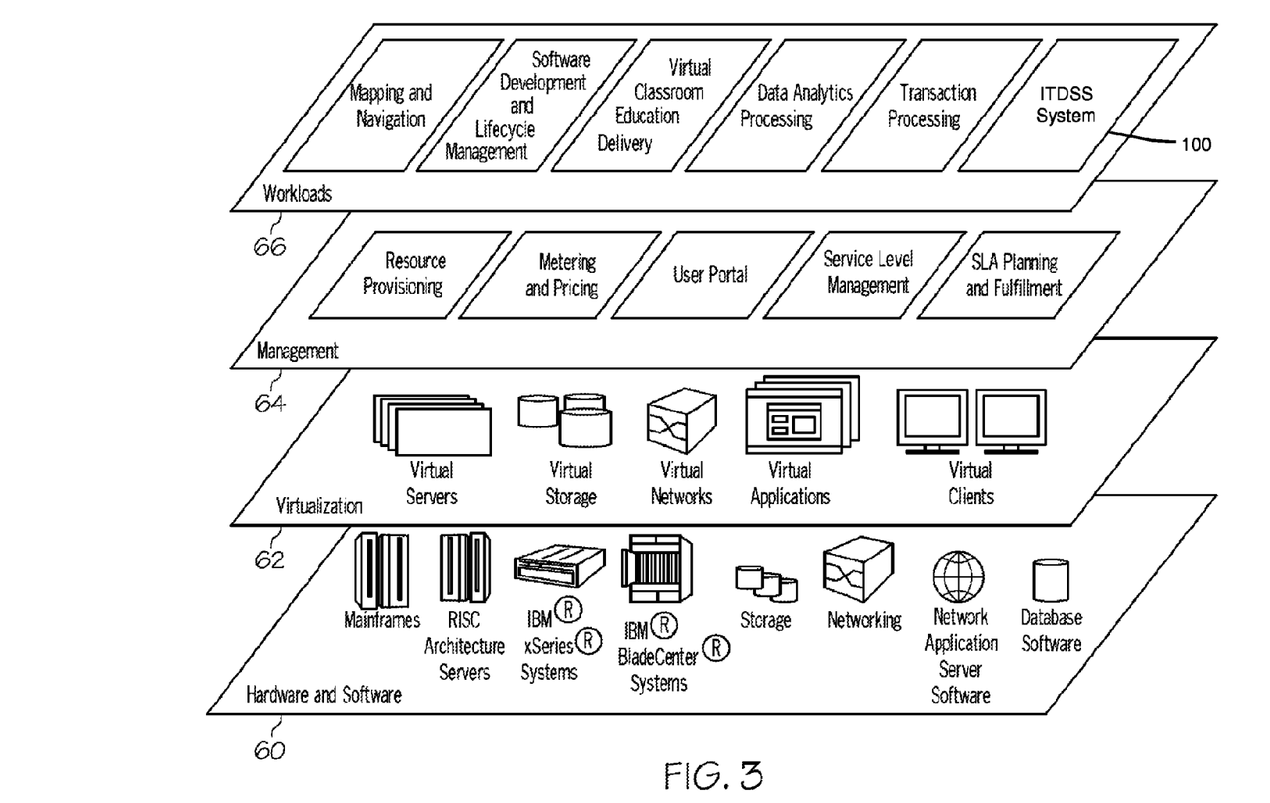
FIG. 3 depicts abstraction model layers in accordance with aspects of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and an intelligent tenant drive security steward (ITDSS) system 100 which ensures data security in physical layers of the cloud computing environment.

More specifically, in embodiments, the ITDSS system 100 includes a hard (e.g., physical) key allotted or personalized to each tenant or client (e.g., company) using one or more cloud services. The ITDSS system 100 further includes a hard key slot fitted to the respective hard key. The ITDSS system 100 further includes a hard key controller or a "core ITDSS" which may work with a hard disk controller to ensure data security in a hard disk based on a physical condition, such as, for example, whether the tenant physically places the respective hard key into the hard key slot.

In embodiments, when the tenant and/or the cloud services attempt to access the hard disk, the hard disk controller, by default, denies access until the tenant physically places the respective hard key into the hard key slot. Once this is done, the hard key controller detects the physical condition, may generate a unique soft (e.g., software) key, and may send the generated soft key to the hard disk controller. Based on the generated soft key, the hard disk controller may allow only the tenant to have access to the data. That is, the hard disk controller may synchronize the hard disk (e.g., at least one sector) for access by only the tenant.

In operation, the hard key effectively identifies its tenant to the hard key controller and the hard disk controller as a user or owner of at least a portion of the hard disk. By placing the hard key into the respective hard key slot, the tenant effectively reserves the hard disk (e.g., at least one sector) for the tenant's use. While the hard key is placed into the respective hard key slot, other tenants without the hard key cannot access the hard disk, e.g., reserved sectors therein or in the cloud computing environment. Advantageously, the ITDSS system 100 ensures a deeper level of security in the cloud computing environment, thus enabling cloud service providers to gain client confidence.

Figure 4:
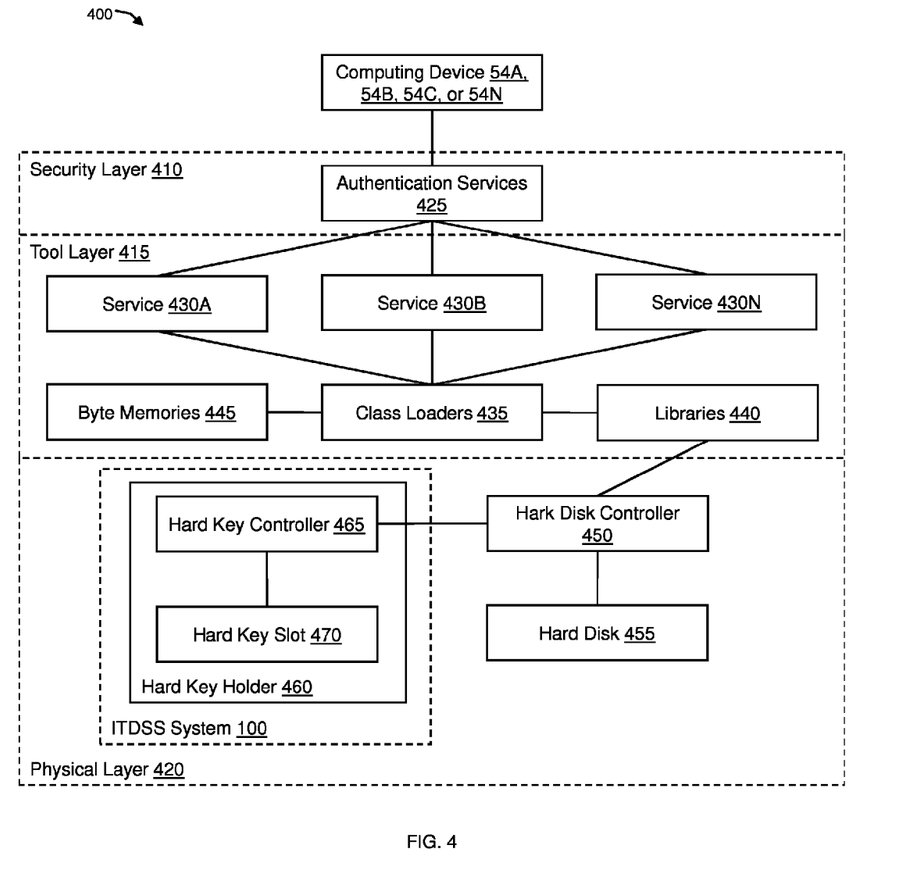
FIG. 4 depicts an illustrative environment in accordance with aspects of the present invention.

FIG. 4 depicts an illustrative environment 400 in accordance with aspects of the present invention. In embodiments, the environment 400 can include the computing device 54A, 54B, 54C, or 54N operated by at least one consumer, a security layer 410, a tool layer 415, and a physical layer 420. Together, the security layer 410, the tool layer 415, and the physical layer 420 may be considered to be a cloud layer provided by a cloud service provider. The security layer 410 may include one or more authentication services 425. The tool layer 415 may include services 430A, 430B, and 430N, one or more class loaders 435, one or more libraries 440, and one or more byte memories 445. The physical layer 420 may include a hard disk controller 450, one or more hard disks 455, and the ITDSS system 100 of FIG. 1. The ITDSS system 100 may include a hard key holder 460 (e.g., a key hook substrate (KHS)) which includes a hard key controller 465 and a hard key slot 470. Each of the components in the security layer 410, the tool layer 415, and the physical layer 420 may be implemented in and/or by the computer system/server 12 of FIG. 1, for example. The computer system/server 12 may be in the cloud computing node 10 and practiced in distributed cloud computing environments.

In embodiments, the computing device 54A, 54B, 54C, or 54N is in communication with the authentication services 425, and can invoke the services 430A, 430B, and 430N. The services 430A, 430B, and 430N may include any type of services, e.g., web services. The services 430A, 430B, and 430N may be hosted by one or more respective tenants or clients (e.g., companies) using one or more cloud services, such as, for example, software as a service (SaaS) and/or infrastructure (e.g., data storage) as a service (IaaS), which are provided by the cloud service provider. That is, the software and/or the infrastructure utilized to operate the services 430A, 430B, and 430N may be provided by the cloud service provider as a service. For example, the cloud service provider may provide the tenants use of the class loaders 435, the libraries 440, the byte memories 445, the hard disk controller 450, the hard disks 455, etc., to host the services 430A, 430B, and 430N.

In accordance with further aspects of the invention, to invoke the services 430A, 430B, and 430N, the computing device 54A, 54B, 54C, or 54N can, e.g., provide a user name and/or a password to the authentication services 425 or at an ingress boundary of a service transaction. Based on the user name, the password, and/or other security mechanisms for ensuring data security at the upper layers that are contemplated by the invention, the authentication services 425 may authorize and connect the computing device 54A, 54B, 54C, or 54N as a registered user of the services 430A, 430B, and 430N. When the service 430A, 430B, or 430N (e.g., the service 430A hosted by a first tenant) is provided to the user, the service 430A, 430B, or 430N may have to access data in the hard disks 455. To do so, in embodiments, the service 430A, 430B, or 430N may invoke the class loaders 435 to retrieve the data from the hard disks 455.

In embodiments, to retrieve the data from the hard disks 455, the class loaders 435 invoke the libraries 440 which can include one or more virtual addresses where the data is stored in the hard disks 455. The libraries 440 retrieve such virtual addresses and sends the virtual addresses to the hard disk controller 450. The hard disk controller 450 (of the hard disks 455) translates the virtual addresses to one or more physical addresses of surfaces, tracks, and/or sectors in the hard disks 455 that are storing the data. Based on such physical addresses, the hard disk controller 450 retrieves the data from the hard disks 455, which is returned to the class loaders 435. The class loaders 435 create instances in the byte memories 445 (e.g., a random access memory (RAM)) to include the returned data, which may be used by the service 430A, 430B, or 430N.

In accordance with further aspects of the invention, to ensure data security in the lower layer (e.g., the physical layer 420), the ITDSS system 100 includes a hard (e.g., physical) key allotted or personalized to each tenant of the services 430A, 430B, and 430N. The hard key slot 470 may be fitted to the respective hard key. The hard key controller 465 or a "core ITDSS" may reside within the hard key holder 460 and may work with the hard disk controller 450 to ensure data security in the hard disks 455 based on a physical condition, such as, for example, whether the tenant physically places the respective hard key into the hard key slot 470. In embodiments, the hard key holder 460 may be dedicated to providing data security to the hard disks 455 or to sectors of the hard disks 455. In additional or alternative embodiments, the ITDSS system 100 may include a plurality of hard key holders, and each of the hard key holders may be dedicated to providing data security to a respective hard disk.

More specifically, in embodiments, when the class loaders 435 (e.g., via the libraries 440) attempt to access the hard disks 455, the hard disk controller 450, by default, denies access until the tenant physically places the respective hard key into the hard key slot 470. A sector of the hard disks 455 that is relevant to the tenant (e.g., includes the data) may be protected by a preamble flag which, by default, may be set to non-complied ("NC"), indicating to the hard disk controller 450 that access to the sector is not allowed. Once the respective hard key is placed into the hard key slot 470, the hard key controller 465 detects the physical condition, generates a unique soft (e.g., software) key, and sends the generated soft key to the hard disk controller 450. Based on the generated soft key, the hard disk controller 450 allows only the tenant to have access to the data, e.g., by setting the relevant sector's preamble flag to a complied mode ("C") which indicates that the tenant is allowed access to the data in one or more sectors of the hard disks 455. That is, the hard disk controller 450 may synchronize the hard disks 455 (e.g., at least one sector) for access by the tenant.

In operation, the hard key effectively identifies its tenant to the hard key controller 465 and the hard disk controller 450 as a user or owner of at least a portion of the hard disks 455 or data reading therein. By placing the hard key into the respective hard key slot 470, the tenant effectively reserves the hard disk 450 (e.g., at least one sector) for the tenant's use. While the hard key is placed into the respective hard key slot 470, other tenants without the hard key cannot access the hard disk 450 or their reserved sectors.

In embodiments, the ITDSS system 100 can ensure data security at more granular levels of the hard disks 455. For example, the ITDSS system 100 may be used to protect tenant data stored in tracks of the hard disks 455. In another example, the ITDSS system 100 may provide a tenant access to sectors having data which is, e.g., read only.

In accordance with further aspects of the invention, a sector or track of the hard disks 455 can be protected by a key instead of or in addition to a preamble flag. In embodiments, the key may include a header which carries a matching key that may match the soft key generated by the hard key controller 465. When the tenant attempts to access the relevant sector, the hard disk controller 450 ensures that the soft key received from the hard key controller 465 matches the matching key in the sector before allowing access to the sector. Advantageously, the ITDSS system 100 ensures a deeper level of security in cloud-based environments, thus enabling cloud service providers to gain client confidence.

As will be appreciated by one skilled in the art, aspects of the present invention, including the ITDSS system 100 and the functionality provided therein, may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
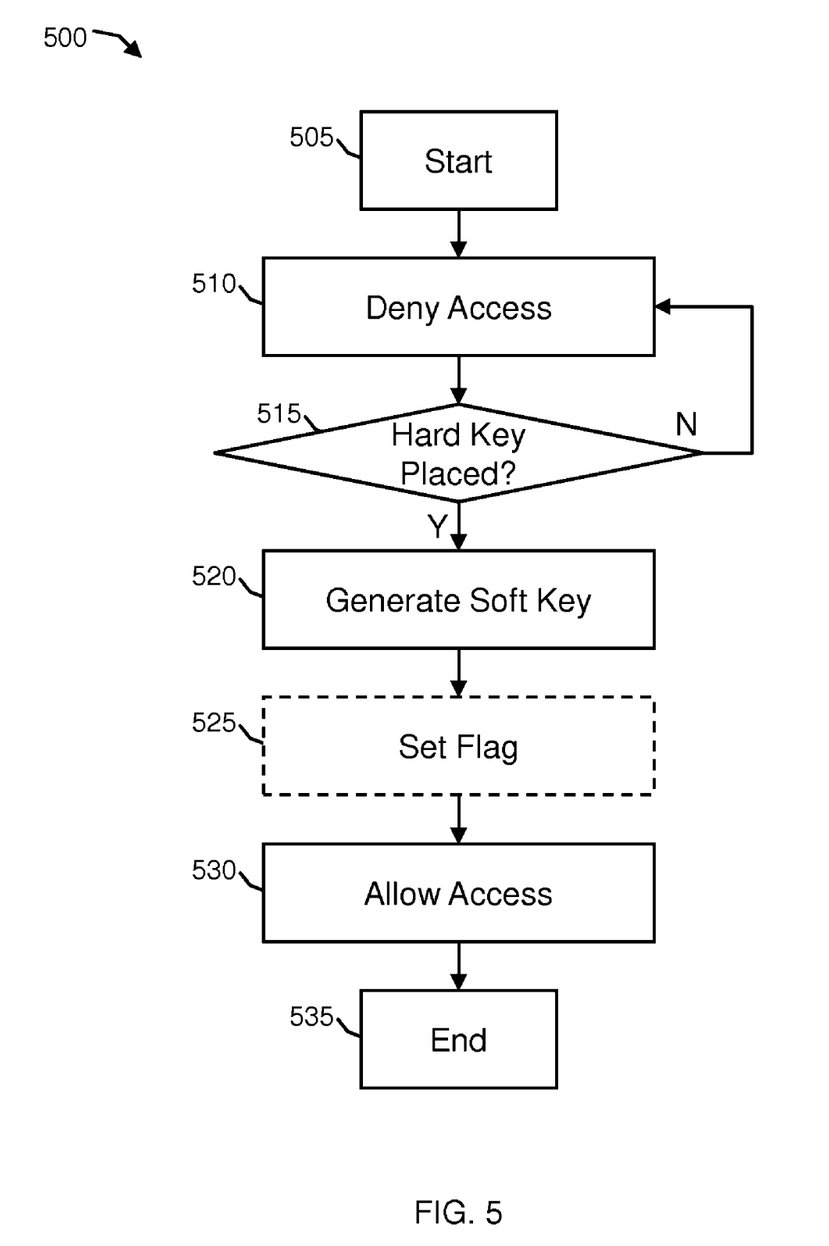
FIG. 5 depicts an exemplary flow diagram in accordance with aspects of the present invention.

FIG. 5 shows exemplary flows for performing aspects of the present invention. The steps of FIG. 5 may be implemented in the environments of FIGS. 1-4, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environments of FIGS. 1-4. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 5 depicts an exemplary flow for a process 500 in accordance with aspects of the present invention. In embodiments, the process 500 can be performed by components of the physical layer 420 (e.g., the hard disk controller 450 and/or the hard key controller 465) in FIG. 4, for example, to ensure data security in the physical layer 420. At step 505, the process starts. At step 510, when a tenant (e.g., company) and/or a cloud service attempts to access a hard disk (e.g., the hard disks 455 in FIG. 4) provided by a cloud service provider, the hard disk controller, by default, denies access until the tenant physically places a respective hard key into a hard key slot.

At step 515, the hard key controller determines whether the hard key is placed into the hard key slot. If so, the process continues at step 520. Otherwise, the process returns to step 510. At step 520, the hard key controller generates a unique soft (e.g., software) key, and may send the generated soft key to the hard disk controller.

At optional step 525, based on the generated soft key, the hard disk controller may set a relevant section of the hard disk's preamble flag to a complied mode ("C") which indicates that the tenant is allowed access to data in the section. At step 530, the hard disk controller allows access to the data to only the tenant. That is, the hard disk controller synchronizes the hard disk (e.g., at least one sector) for access by the tenant. At step 535, the process ends.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   determining whether a tenant places a physical key into a slot associated with a hard disk provided by a service provider;
   allowing the tenant to have access to the hard disk after determining that the tenant has placed the physical key into the slot, wherein the access to the hard disk occurs at a physical layer and includes translating a virtual address, received from a tool layer, into a physical address, wherein:
   the virtual address is stored in libraries in the tool layer;
   the physical address includes at least one of a surface, track, and sensor associated with the hard disk, and
   the physical address provides access to data in the hard disk; and
   sending the data to class loaders in the tool layer, wherein the class loaders create instances in byte memories including the data, and wherein different services located in the tool layer access the byte memories from the class loaders.

2. The method of claim 1, further comprising denying the tenant access to the hard disk before the determining that the tenant has placed the physical key into the slot.

3. The method of claim 1, further comprising generating a soft key after the determining that the tenant has placed the physical key into the slot.

4. The method of claim 3, further comprising allowing the tenant to have access to the hard disk based on the generated soft key.

5. The method of claim 3, wherein:
   the hard disk is protected by a preamble flag which is initially set to non-complied to indicate that access to the hard disk is not allowed; and
   further comprising setting the preamble flag to complied based on the generated soft key, to indicate that access to the hard disk is allowed.

6. The method of claim 3, wherein:
   the hard disk is protected by a matching key; and
   further comprising allowing the tenant to have access to the hard disk after determining that the generated soft key matches the matching key.

7. The method of claim 1, wherein:
   the hard disk is protected by a preamble flag which is initially set to non-complied to indicate that access to the hard disk is not allowed; and
   further comprising setting the preamble flag to complied to indicate that access to the hard disk is allowed, after the determining that the tenant has placed the physical key into the slot.

8. The method of claim 1, wherein the physical key and the slot are provided by the service provider.

9. The method of claim 1, wherein the physical key is allotted to the tenant.

10. The method of claim 1, further comprising, after the determining that the tenant has placed the physical key into the slot, allowing the tenant to have access to at least one of:
    at least one sector of the hard disk;
    at least one track of the hard disk; and
    at least one type of data in the hard disk.

11. A system implemented in hardware, comprising:
    a computer infrastructure operable to:
    deny a tenant access to a hard disk provided by a service provider before sensing that the tenant has placed a physical key into a slot associated with the hard disk;
    sense that the tenant has placed the physical key into the slot;
    allow the tenant to have access to the hard disk after the physical key has been sensed in the slot, wherein the access to the hard disk occurs at a physical layer and includes translating a virtual address into a physical address associated with a location within the hard disk, wherein:
    the virtual address is stored in libraries in the tool layer;
    the physical address includes at least one of a surface, track, and sensor associated with the hard disk, and
    the physical address provides access to data in the hard disk; and
    sending the data to class loaders in the tool layer, wherein the class loaders create instances in byte memories including the data, and wherein different services located in the tool layer access the byte memories from the class loaders.

12. The system of claim 11, wherein the computer infrastructure is further operable to generate a soft key after the tenant has placed the physical key into the slot.

13. The system of claim 12, wherein the computer infrastructure is further operable to allow the tenant to have access to the hard dist based on the generated soft key.

14. The system of claim 11, wherein:
    the hard disk is protected by a preamble flag which is initially set to non-complied to indicate that access to the hard disk is not allowed; and
    the computer infrastructure is further operable to set the preamble flag to complied to indicate that access to the hard disk is allowed, after the tenant has placed the physical key into the slot.

15. The system of claim 11, wherein the physical key and the slot are provided by the service provider.

16. The system of claim 11, wherein the physical key is allotted to the tenant and associated with the hard disk.

17. The system of claim 11, wherein the computer infrastructure is further operable to, after the sensing that the tenant has placed the physical key into the slot, allowing the tenant to have access to at least one of:
- at least one sector of the hard disk;
- at least one track of the hard disk; and
- at least one type of data in the hard disk.

18. A computer program product comprising a tangible computer usable storage device or memory having readable program code embodied in the tangible computer usable storage device or memory, the computer program product includes at least one component operable to:
- determine that a tenant has placed a physical key into a slot associated with a hard disk serviced by a service provider;
- allow the tenant access to the hard disk after determining that the tenant has placed the physical key into the slot, wherein the access to the hard disk includes translating virtual addresses into physical addresses associated with a location within the hard disk, wherein:
- the virtual address is stored in libraries in the tool layer;
- the physical address includes at least one of a surface, track, and sensor associated with the hard disk, and
- the physical address provides access to data in the hard disk; and
- send the data to class loaders in the tool layer, wherein the class loaders create instances in byte memories including the data, and wherein different services located in the tool layer access the byte memories from the class loaders.

19. The computer program product of claim 18, wherein the at least one component is further operable to deny the tenant access to the hard disk before the determining that the tenant has placed the physical key into the slot.

20. A method of tenant drive security, comprising:
providing a computer infrastructure being operable to:
- provide a tenant using a service with access to a hard disk, a personalized physical key, and a key hook substrate associated with the hard disk;
- generate, in a physical layer, a unique key once the physical key is placed into a slot of the key hook substrate;
- deny, by default, access to the hard disk until the physical key is placed into the slot;
- send the unique key to a hard disk controller; and
- set a flag to complied in relevant sectors of the hard disk to allow access to the hard disk, wherein the access includes translating a virtual address, received from libraries in a tool layer, into a physical address, wherein:
- the virtual address is stored in the libraries in the tool layer;
- the physical address includes at least one of a surface, track, and sensor associated with the hard disk, and
- the physical address provides access to data in the hard disk; and
- sending the data to class loaders in the tool layer, wherein the class loaders create instances in byte memories including the data, and wherein different services located in the tool layer access the byte memories from the class loaders.

21. The method of claim 20, wherein the flag is initially set to non-complied to indicate that access to the hard disk is not allowed.

22. A computer system for tenant driven security, the system comprising:
- a CPU, a computer readable memory and a tangible computer readable storage media;
- first program instructions to provide a tenant using a service with access to a hard disk, a personalized physical key, and a key hook substrate associated with the hard disk;
- second program instructions to generate a unique key once the physical key is placed into a slot of the key hook substrate;
- third program instructions to deny, by default, access to the hard disk until the physical key is placed into the slot;
- fourth program instructions to send the unique key to a hard disk controller;
- fifth program instructions to set a flag to complied in relevant sectors of the hard disk to allow access,
- wherein the flag is initially set to non-complied to indicate that access to the hard disk is not allowed;
- sixth program instructions to set the flag to complied based on the generated soft key, to indicate that access to the hard disk is allowed, wherein:
- the access to the hard disk occurs at a physical layer and includes translating a virtual address, received from a tool layer, into a physical address;
- the virtual address is stored in libraries in the tool layer; the physical address includes at least one of a surface, track, and sensor associated with the hard disk, and
- the physical address provides access to data in the hard disk; and seventh program instructions to send the data to class loaders in the tool area, wherein the class loaders create instances in byte memories including the data, and wherein different services located in the tool layer access the byte memories from the class loaders, and
- wherein the first, second, third, fourth, fifth, sixth, and seventh program instructions are stored on the tangible computer readable storage media for execution by the CPU via the computer readable memory.

* * * * *